United States Patent [19]
Maison

[11] 3,827,364
[45] Aug. 6, 1974

[54] ADHESION AIR BEARING FEEDBACK CONTROL APPARATUS AND METHOD

[75] Inventor: Richard L. Maison, San Diego, Calif.

[73] Assignee: Rohr Industries Inc., Chula Vista, Calif.

[22] Filed: Oct. 25, 1972

[21] Appl. No.: 300,504

[52] U.S. Cl. ............ 104/23 FS, 180/118, 214/1 BE
[51] Int. Cl. ............................................. B61b 13/08
[58] Field of Search ......... 104/23 FS, 134; 180/118, 180/120, 121, 122; 214/1 BE; 294/64 B

[56] References Cited
UNITED STATES PATENTS

| | | | |
|---|---|---|---|
| 3,168,307 | 2/1965 | Walton | 294/64 B |
| 3,223,443 | 12/1965 | Mission | 294/64 B |
| 3,439,772 | 4/1969 | Giraud | 180/118 |
| 3,727,715 | 4/1973 | Barthalon | 104/23 FS |

*Primary Examiner*—M. Henson Wood
*Assistant Examiner*—D. W. Keen

[57] ABSTRACT

The method and apparatus which utilizes Bernoulli's theorem, in part, for controlling the displacement H of an air bearing relative to its support surface wherein the fluid under pressure from a pressure source is supplied to a region intermediate the bearing and the support surface to suspend or alternatively, to levitate the bearing a predetermined equilibrium distance H from the surface. The supply of fluid from the pressure source is regulated by a valve in response to pressure variations sensed at least one of different pressure zones of the region through a passage in the bearing connecting said one zone of the region and the valve to maintain the predetermined separation or displacement distance.

9 Claims, 4 Drawing Figures

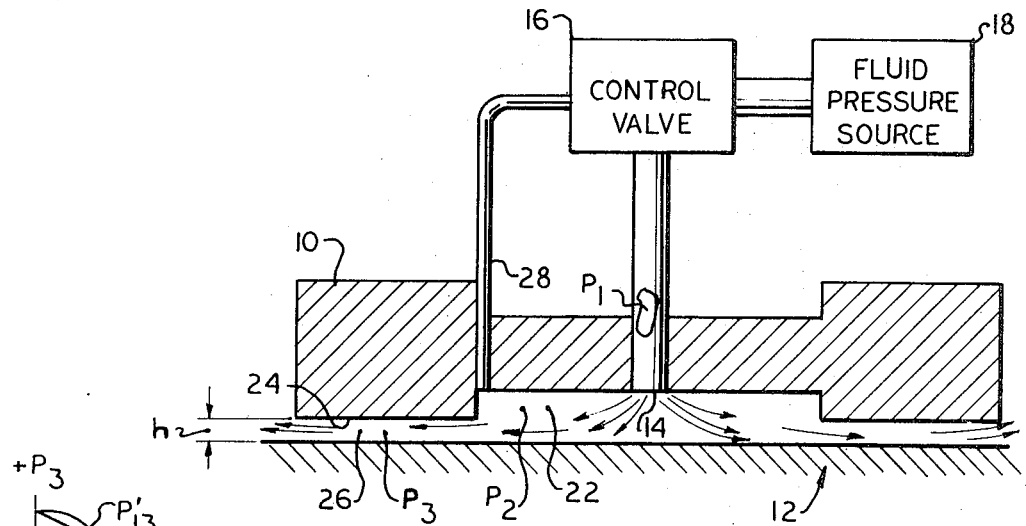
FIG. 1
FIG. 1A
FIG. 1B
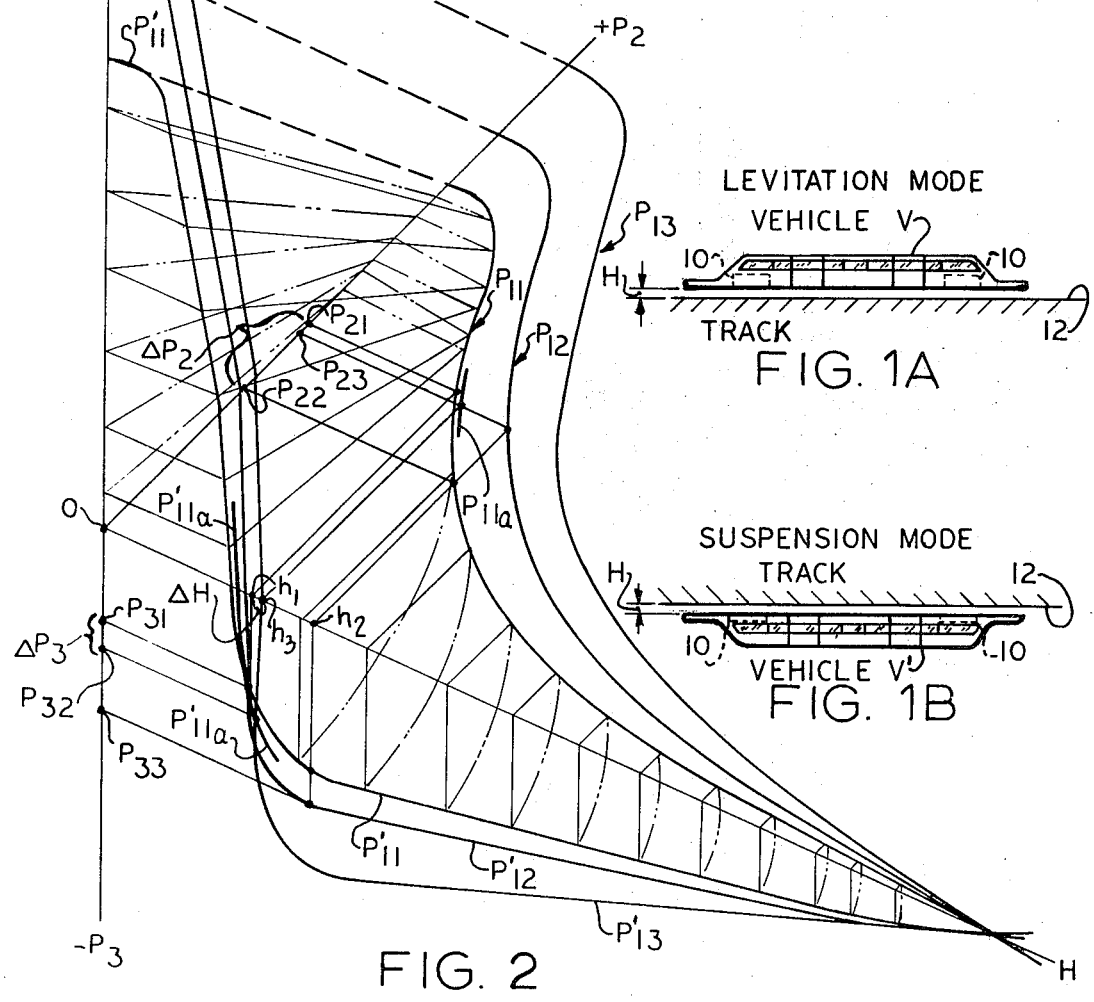
FIG. 2

ADHESION AIR BEARING FEEDBACK CONTROL APPARATUS AND METHOD

BACKGROUND OF THE INVENTION

Normally, operation of an air bearing requires that the bearing be separated a predetermined equilibrium distance from the support surface by means of an air layer established therebetween. However, during such operation changes in loading and/or fortuitous dynamic load impacts may be applied to the air bearing which would tend to increase or decrease this distance from the surface and destroy the established equilibrium of the bearing.

Thus, it would be desirable to provide a control system which would maintain a suspended, or alternatively, a levitated air bearing at its predetermined equilibrium separation distance from the support surface notwithstanding the application of dynamic loads tending to increase or decrease this distance. A suitable control system would utilize a feedback arrangement to maintain the equilibrium distance. The arrangement would regulate the supply of pressure fluid used to establish the separation distance in response to fluid pressure changes occurring within the region between the bearing and its support surface as a result of applied disturbing dynamic forces.

The feedback control system would sense the pressure in at least one of different pressure zones within the region, preferably in a zone wherein the delta pressure change for unit change in separation distance is a maximum. The literature such as exemplified by the paper "Analysis and Design of Externally Pressurized Gas Bearings" by I. C. Tang and W. A. Gross, American Society of Lubrication Engineers, Transactions 5, 261–284 (1962), recognizes the application of the Bernoulli region (page 261) to air bearings. The literature, however, provides no disclosure or suggestion of a feedback control system utilizing such principles. Such a system is provided by the control apparatus of the present invention.

SUMMARY OF THE INVENTION

The present invention relates to a method and apparatus for controlling the separation distance of an air bearing wherein fluid under pressure is supplied to a region intermediate the bearing and support surface to establish the bearing at a predetermined equilibrium distance from the surface, and wherein said equilibrium distance falls within a separation range corresponding to negative pressures in accordance with Bernoulli's theorem. The supply of fluid is regulated by feedback responsive to pressure variations sensed in the region to maintain the predetermined equilibrium distance.

A force tending to increase the separation distance creates an increase of negative pressure within the Bernoulli range of negative pressures which results in a holding force preventing separation. On the other hand, a force tending to decrease the separation distance results in a positive pressure at the interface preventing ultimate closure and contact. Thus, the present invention provides an adhesion air bearing which operates, in effect, on a push-pull pressure principle. As such, the bearing may be used alternatively for suspension or for levitation applications therefor.

BRIEF DESCRIPTION OF THE DRAWINGS

FIG. 1 is a cross section of an adhesion air bearing utilized in the present invention with a diagrammatic showing of the feedback control system for controlling the separation distance of the bearing with respect to its support surface; and FIGS. 1a and 1b are diagrammatic showings of rapid transit vehicles, operative respectively in levitation and suspension modes and employing the adhesion air bearing of FIG. 1 in accordance with the principles of the present invention;

FIG. 2 is a graph relating various parameters which is helpful in understanding operation of the bearing and feedback control system of FIG. 1.

DESCRIPTION OF PREFERRED EMBODIMENT

Referring first to FIG. 1a, there is shown a vehicle V which is of a well known rapid transit type commonly referred to as a tracked air cushion vehicle (TACV). As shown in FIG. 1a, vehicle V is in its usual levitation mode wherein one or more air bearings or cushion layers of air support the vehicle an operating levitation distance H above the track or supporting surface 12. While the air layers thus support the weight of the vehicle against gravity, gravity alone is not sufficient under all types of operating conditions to provide an adequate hold down force to oppose dynamic load impacts due to wind and inertial forces acting on the vehicle. As presently to be described, the adhesion air bearings employed to levitate vehicle V in accordance with this invention, also utilize the Bernoulli range of negative pressures to develop hold down forces under feedback control.

In FIG. 1b, vehicle V' is shown in a suspension mode wherein the vehicle is suspended an operating or separation distance H below the track or supporting surface 12. In this arrangement, the negative pressures in the Bernoulli range support the weight of the vehicle against gravity and also by the provision of feedback develop opposition forces to maintain equilibrium notwithstanding changes in dynamic loading on the vehicle. The air layers, of course, in an air bearing sense, prevent the vehicle from reducing the separation distance H to zero.

Referring to FIG. 1, the numeral 10 designates an adhesion air bearing which may be used for the purposes of FIGS. 1a and 1b. Bearing 10 is shown separated from the support surface 12 a predetermined distance H. FIGS. 1a and 1b depict an arrangement for deploying the adhesion air bearings 10 in the vehicles V and V'.

The bearing 10 is generally shaped as shown and has an inlet orifice 14 into the region 22 and connected through a control valve 16 to a source of fluid pressure 18 adapted to supply fluid under pressure sufficient to develop a pressure $P_1$ for separating the bearing from the support surface 12 by the distance H. A recess in the bearing around the inlet orifice 14 defines said pressure region 22 wherein the fluid pressure $P_2$ develops during operation of the bearing. The bearing has a peripheral bottom surface 24 defining a region 26 wherein a fluid pressure $P_3$ is also developed during levitation or suspension, as the case may be. A fluid passage 28 connects the pressure region 22 to the valve 16 whereby the valve may sense the pressure variation $P_2$ occurring therein during bearing operation to control the flow of fluid from the pressure source 18 in accordance therewith.

FIG. 2 depicts a plot of pressures $P_1$, $P_2$, and $P_3$ in relation to the separation distance H. Separation distances such as $h_1$, $h_2$ and $h_3$ are plotted along the H axis. Pressure $P_2$ in zone 22 such as pressures $P_{21}$, $P_{22}$, and $P_{23}$ are positive and are plotted along the $+ P_2$ axis. Pressure $P_3$ in zone 26 such as pressures $P_{31}$, $P_{32}$, and $P_{33}$ are negative in the Bernoulli range and are plotted along the $+ P_3$, $- P_3$ axis. Corresponding $P_2$ pressures and distances h along axis H such, for example, as $P_{21}$, and $h_1$, establish or correspond to a family of $P_1$ pressures depicted in the H, $P_2$ plane, curves representing such family of $P_1$ pressures being designated $P_{11}$, $P_{12}$, and $P_{13}$. Similarly, corresponding $P_3$ pressures and distances h along axis H such, for example, as $P_{31}$ and $h_1$, establish or correspond to a family of $P_1$ pressures depicted in the H, $+ P_3$, $- P_3$ plane, curves representing such family of $P_1$ pressures being designated $P'_{11}$, $P'_{12}$, and $P'_{13}$.

Referring to FIG. 2, operation of the bearing and control apparatus of FIG. 1 may be described as follows: First, let it be assumed that the fluid at the inlet 14 is supplied at a pressure $P_{11}$, $P'_{11}$ sufficient to separate and maintain at equilibrium the bearing a distance $h_1$ from the surface 12. Positive fluid pressure of magnitude $P_{21}$ is developed in the region 22, as well as the negative pressue $P_{31}$ in the region 26. The pressure $P_{31}$ is negative, thus effecting a pulling force on the air bearing 10.

Also for example, let it now be assumed that a dynamic load is applied to the bearing 10 tending to increase the separation distance of the bearing 10 from the equilibrium distance $h_1$ to a distance $h_2$. The pressure $P_{31}$ in region 26 drops toward a pressure $P_{32}$. Pressure $P_{21}$ in the region 22 starts to drop toward a pressure $P_{22}$. The difference $\Delta P_2$ between the pressures $P_{21}$ and $P_{22}$, becoming appreciable, is sensed through the passage 28 by the control valve 16 which opens in response thereto to increase the quantity of fluid flow from the pressure source 18. The supply pressure to inlet orifice 14 now increases from $P_{11}$ toward $P_{12}$. The bearing, however, finds equilibrium when the pressure in region 22 increases to a magnitude of $P_{23}$.

It will be appreciated that the difference between pressure $P_{21}$ and $P_{23}$ is small. The restoring force now developed on the bearing as a result of the pressure $P_{33}$ in region 26 is more negative than the force developed by the pressue $P_{32}$, and accordingly the pulling or restoring force on the bearing is now greater than the separating force exerted on the bearing 10 by the applied dynamic load. The bearing separation distance now closes to a distance of $h_3$, which is the bearing equilibrium distance for the $P_{11a}$, $P'_{11a}$ pressure magnitude. It is to be appreciated that $\Delta H$, which is the difference between the distances $h_1$ and $h_3$, is a very small quantitiy. When the shock load dissipates the pressure $P_{23}$ in region 22 will return to the pressure $P_{21}$, the pressure $P_{32}$ in region 26 will return to the pressure $P_{31}$ and the inlet pressure $P_{11a}$, $P'_{11a}$ will return to pressure $P_{11}$.

Obviously many modifications and variations of this invention are possible in view of the above teachings. For example, whereas the pressure $P_2$ in the region 22 is sensed in the arrangement disclosed and described, alternatively, the pressure zone 26 could be sensed to provide a desired level of feedback control. It is therefore to be understood that within the scope of the appended claims the invention may be practiced otherwise than as specifically described.

Having thus described the invention, what is claimed as new and useful and is desired to be protected by U.S. Letters Patent is:

1. In combination with a vehicle for moving along a support surface in spaced relation therewith, means for generating first and second equilibrium pressures in the air space between said vehicle and its support surface to maintain equilibrium of the vehicle at a normal operating spacing therebetween, said first pressure tending to urge the vehicle away from its support surface to increase the spacing there between and said second pressure tending to urge the vehicle toward its support surface to decrease the spacing there between, means responsive to a change in one of said first and second pressures due to a disturbing force on the vehicle tending to change said spacing for changing said pressures to establish equilibrium at a new spacing as long as said force persists, a variable source of air under pressure for supplying air to first and second zones within said space between the vehicle and its support surface to generate said first and second pressures respectively within said first and second zones.

2. The combination as in claim 1 wherein said support surface is a track disposed below the vehicle.

3. The combination as in claim 1 wherein said support surface is a track disposed above the vehicle.

4. The combination as in claim 1 wherein said first zone constitutes an air cushion having positive air pressures therein corresponding to said first pressure, and said second zone constitutes an air bearing having negative air pressure therein corresponding to said second pressure.

5. The combination as in claim 1 wherein said source of air under pressure is varied under control of said pressure responsive means to vary said first and second pressures.

6. The combination as in claim 5 wherein said pressure responsive means is a valve having pressure sensing means in communication with said first zone and air flow control means in communication with said source of air under pressure.

7. The combination as in claim 1 wherein said variable source of air under pressure, said pressure responsive means, and said first and second pressure generating means constitute a device carried by the vehicle in confronting relation to the support surface, said device having a peripheral surface in spaced adjacency with respect to said support surface and defining said second zone therebetween, said device having a second surface disposed internally of said peripheral surface, said second surface being disposed in confronting spaced relation to the support surface and defining therewith said first zone.

8. The combination as in claim 7 wherein said spaced adjacency corresponds to said spacing between the vehicle and its support surface.

9. The combination as in claim 7 wherein said second surface is spaced a greater distance from said support surface than said peripheral surface.

* * * * *